United States Patent Office 3,839,486
Patented Oct. 1, 1974

3,839,486
PROCESS FOR THE ISOMERIZATION OF OLEFINS
Robert P. Arganbright, Seabrook, Tex., assignor to Petro-Tex Chemical Corporation, Houston, Tex.
No Drawing. Continuation-in-part of abandoned application Ser. No. 128,199, Mar. 25, 1971. This application Jan. 10, 1973, Ser. No. 322,449
Int. Cl. C07c 5/30
U.S. Cl. 260—683.2                11 Claims

ABSTRACT OF THE DISCLOSURE

Aliphatic hydrocarbon olefins, particularly those having 4 to 6 carbon atoms are isomerized to their equilibrium mixture over a unique catalyst of PdO, $MoO_3$ on a support. For example, butene-1 at a GHSV of 120° at 50° C. over a 2% PdO-10% $MoO_3$ on alumina gave 94% yield of butene-2 and 6% butene-1.

This application is a continuation-in-part of my co-pending application Ser. No. 128,199, filed on Mar. 25, 1971, now abandoned.

This invention relates to a novel catalytic process for the isomerization of olefins. More particularly it concerns the isomerization of aliphatic hydrocarbon olefins having 4 to 20 carbon atoms.

The isomerization described herein are those relating to the ethylenic unsaturation of the olefins as opposed to those isomerizations where there is a rearrangement of the carbon atoms of the olefin. Thus, the product of the present isomerizations will have the same hydrocarbon skeletal structure with merely a rearrangement of the ethylenic unsaturation, e.g.,

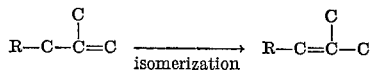

$$R-C-\overset{C}{C}=C \xrightarrow{\text{isomerization}} R-C=\overset{C}{C}-C$$

where R is a hydrocarbon radical having 1 to 16 carbon atoms.

This type of rearrangement is often desirable or necessary as a pre-treatment to prepare a feed material for a particular process, for example, isoamylene can be prepared by the disproportionation of isobutylene and butene-2. The pressure of butene-1 in the feed is a detriment. Furthermore, a large amount of the n-butene available in the butene-1 form. Thus, it is desirable and necessary to be able to convert butene-1 to butene-2 in high conversions and high selectivities. In a reverse manner one may desire a large quantity of butene-1, for example, in the preparation of polybutene-1. The isomerization, of course, will give an equilibrium mixture at the particular conditions employed. By separating the desired isomer and returning the others to the reaction, essentially complete conversion to a particular isomer or isomers can be obtained.

Briefly stated, the present invention is a process for the isomerization of olefins comprising contacting aliphatic hydrocarbon olefins having 4 to 20 carbon atoms and at least one hydrogen atom alpha to the olefinic linkage with a supported catalyst comprising oxygen, palladium and molybdenum.

The unique isomerization catalyst of the present invention comprises oxygen, palladium and molybdenum. The catalyst in particular comprises a mixture of an oxide of palladium and an oxide of molybdenum on a support. The catalyst can be prepared in several ways to obtain the benefits therefrom. For example, the oxides of palladium and molybdenum can be slurried together then deposited on the support. Or the oxide components may be applied sequentially from a slurry such as placing $MoO_3$ on an alumina support to which a palladium compound is applied. Another approach is to employ soluble compounds of Pd and Mo which are applied simultaneously or sequentially then dried and converted to the oxides by air oxidation. Another modification of this approach is to precipitate or coprecipitate Pd and Mo onto the support and to convert to the oxide subsequently.

One preferred method of catalyst preparation has been to impregnate a support material with a solution of ammonium molybdate in solution, then convert the molybdenum to the corresponding oxides by heating in a non-reducing atmosphere. The palladium is then deposited on the Mo oxide as dichloro palladium tetramine which is converted to $PdCl_2$ on heating. By heating the palladium containing catalyst in a reducing atmosphere, e.g. hydrogen at 500 to 550° C. the $PdCl_2$ is converted to metallic Pd which then is oxidized by molecular oxygen (usually air) at 400–600° C. to PdO. This procedure provides a means of consistent catalyst quality.

Similarly, regardless of the method of catalyst preparation a catalyst providing more uniform results can be obtained by reduction, for example, with hydrogen, followed by oxidation with molecular oxygen as a pretreatment of the catalyst prior to use. The catalyst of the invention is easily regenerated during use by reoxidation with air at 400°–600° C. The regeneration burns off any coke that has formed and converts any reduced metal back to the catalytically active oxide state.

A wide variety of supports can be used for the active catalyst component, such as silica, silica-alumina, alumina, aluminum phosphate, zirconia, boria, titania, magnesia, pumice, kieselguhr, firebrick and the like. The supported catalyst can be used in a fixed bed or in a movable particulate form, as for example, in a fluidized bed. The surface will be about 2 to 500 m.²/gram. An alumina support is preferred.

The proportion of molybdenum oxide on the support can be varied, generally about 5 to 30 weight percent with the more preferably proportion being in the range of 8 to 15 weight percent of the support. The palladium oxide will be present in the catalyst in weight ratio of palladium oxide to the oxides of molybdenum of about 0.05:1 to 0.6:1 more usually about 0.1:1 to 0.4:1.

As a pretreatment of the catalyst, in order to reduce or eliminate disproportionation side reactions, it was found desirable to deactivate these sites by initially feeding about 5 to 40 volume percent air along with the aliphatic olefin hydrocarbon feed. The disproportionation sites are quickly deactivated and the air can be discontinued after a few minutes, e.g., 15 to 30 minutes, depending on rate of flow, ratio of air to hydrocarbon catalyst composition, temperature pressure and phase (vapor or liquid). The proper point to discontinue the air feed can be easily determined by monitoring the effluent gas to determine when the dismutation products are no longer present. The catalysts of the invention have long life and are not poisoned by traces of air or water in the feed. They may be poisoned by halogen compounds but are completely regenerable as described above.

The isomerization can be carried out in either vapor or liquid phase. Sub to super atmospheric pressure can be employed, however, generally about 1 to 50 atmospheres will be used. In the case of liquid phase reactions only enough pressure to maintain the liquid phase is employed and no advantage is to be gained from excessive pressure beyond that. A very wide temperature range is applicable to the present process, say about −20 to 200° C., however, temperatures in the range of 0 to 150° C. are more normally used with the best result being obtained in the range of about 25 to 100° C.

In addition to the olefin feed the reaction can contain an inert diluent, although it is not necessary. Suitable inert diluents include alkyl and aromatic hydrocarbons such as butane, hexane, octane, benzene, toluene, xylene and the like.

The olefin feed can be conducted through the reaction chamber at a wide range of flow rates. The optimum flow rate will depend on such variables as temperature, pressure, state (vapor or liquid) catalyst particle size and surface area and the like. Generally the flow rates will be within the range of about 10 to 200 gaseous volumes or 0.5 to 10 liquid volumes of olefin feed per volume of reaction zone containing catalyst per hour, referred to as gaseous hourly space velocity (GHSV) and liquid hourly space velocity (LHSV) respectively, and is expressed as reciprocal hours.

The feed for the isomerization is a hydrocarbon olefin having 4 to 20 carbon atoms and having at least one hydrogen atom alpha to the olefinic linkage, that is to say that there is at least one hydrogen atom on a carbon atom immediately adjacent to olefinic grouping,

Other than the above requirement of having at least one hydrogen atom alpha to the ethylenic linkage, the olefin can be an internal or external olefin and have substituted thereon alkyl, cycloalkyl (branded and straight chain) aryl, alkaryl, aralkyl radicals and the like. Some representative examples of suitable feeds are butene-1; butene-2; 3-methyl butene-1; 3-methyl butene-2; 4-methyl pentene-1; 4-methyl pentene-2; 4-methyl pentene-3; 3-methyl pentene-1; 3-methyl pentene-2; octene-1; 3-ethylnonene-2; 5-methyl pentadecene-7; eicosene-1; 3-phenyl propene; 1,1-diphenyl propene; 3-cyclohexyl propene and the like.

The open chain olefins of 4 to 20 carbon atoms are of particular interest, however, the number of possible isomers at over about 6 carbon atoms substantially increases the problems of separation and purification. A preferred group of aliphatic olefins are those having 4 to 6 carbon atoms.

The following examples demonstrate some of the aspects of the invention. All percentages are by weight unless specified otherwise. Effluent analysis was by gas liquid chromatograph using internal standards.

EXAMPLE 1

A 10% $MoO_3$ precatalyst was prepared by impregnating dry commercial alumina ⅛" pellets (Pechiney-Saint-Gobain GCS–300) with sufficient ammonium molybdate hydrate in solution to give 10% $MoO_3$ on the support (an excess of a saturated solution heated with 50 ml. of Alcoa H–151 alumina will give about 10% by weight $MoO_3$ on the support). The impregnated alumina was dried and heated in air for two hours at 525–550° C. then cooled to room temperature (about 250° C.).

The palladium component was added to the cooled $MoO_3$ precatalyst by adding 35 ml. of aqueous ammonia solution containing .5 gram of $PdCl_2$ for a 1% PdO, 1 gram of $PdCl_2$ for a 2% PdO, 2 grams of $PdCl_2$ for a 4% PdO etc. on the $MoO_3$-support. The $PdCl_2$-$MoO_3$ precatalyst was treated with air at 540° C. until no more $NH_4Cl$ was evolved (about 2 hours) and then reduced with a mixture of nitrogen and hydrogen at 540° C. and finally with pure hydrogen for ½ hour. The reduced precatalyst was then reoxidized with a flow of air (about 200 ml./min.) at 540° C. for several hours during which time it changed from black to light gray in color.

Catalyst prepared in this manner were used in the following examples.

EXAMPLE 2

Fifty ml. of a 2% PdO-10% $MoO_3$ prepared as described in Example 1 was in continuous use for 20½ hours with various hydrocarbon streams in a tubular reactor at 1 atmosphere at which time the feed was changed to 50 ml./min. of pure butene-1. After 1½ hours at 50° C. the effluent was analyzed as 6.1% butene-1, 93.9% butene-2 with traces of propylene and n-pentenes present. Although no specific pretreatment for deactivation of the disproportionation sites was performed it can be considered that the prior 20½ hours of use with various hydrocarbon streams accomplished the same results.

EXAMPLE 3

The catalyst from Example 2 was regenerated by heating in air for several hours at 550° C., cooled to 25° C. under $N_2$ and a feed of butene-1 at 100 ml./min. begun at atmospheric pressure. The reactor became warm (about 50° C.) from the exothermic adsorption or reaction. The initial effluent was about 40% propylene but after 25 minutes on stream analyzed as 0.4% ethylene, 20.0% propylene, 4.2% butene-1, 64.1% butene-2, and 11.3% n-pentenes. The system stabilized at this analysis. The feed was passed through a water scrubber to determine the effect of trace amounts of water on the system. After 1 hour of water contamination the analysis was 0.6% ethylene, 6.2% propylene, 5.0% butene-1, 82.9% butene-2 and 5.3% n-pentenes. Trace amounts of water are not detrimental to the system.

EXAMPLE 4

The catalyst of Example 3 was again regenerated under an air flow at 550° C. for 3 hours and cooled to room temperature (25° C.) under air. Using 50 ml. of catalyst a feed of butene-1 at 100 ml./min. and air at 20 ml./min. was begun. Atmospheric pressure was used. The temperature rose to about 50° C. Traces of ethylene and propylene were in the initial effluent. A sample taken after 20 minutes on stream showed only 6% butene-1 and 94% butene-2. The air was discontinued. After 1 hour the analysis was still 6% butene-1 and 94% butene-2.

EXAMPLES 5–9

In these runs a 2% PdO-10% $MoO_3$ catalyst was prepared according to Example 1. The feed in each run was 2-methyl butene-1 (2-MB-1). A tubular glass reactor equipped with an external water jacket for temperature control was used. 25 cc. of catalyst was used in each Example. Atmospheric pressure was used. Each example was run in one day. When the system was shut down overnight the catalyst was placed under hexane. The first run with the catalyst (Ex. 5) shows high conversion and low selectivity. There was no oxygen pretreatment to deactivate the disproportionation sites, which in this case resulted in oligomerization, thus this first run was in effect the pretreatment. The conditions and results are shown in the Table.

TABLE.—ISOMERIZATION OF 2-MB-1[1] IN FLOW REACTOR

| Example | 5 | 6 | 7 | 8 | 9 |
|---|---|---|---|---|---|
| Temp., °C | 0.3 | 30 | 50 | 55–60 | 60 |
| Feed, cc./hr | 25 | 25 | 61 | 25 | 25 |
| LHSV | 1.0 | 1.0 | 2.4 | 1.0 | 1.0 |
| Total feed, cc | 100 | 50 | 45 | 50 | 50 |
| Wt. percent composition effluent: | | | | | |
| $C^4$ | 0.6 | 0.6 | | 0.9 | |
| 3-MB-1 | | | | | |
| $C^5$ | | 0.4 | 0.4 | 0.4 | 0.5 |
| 2-MB-1 | 11.7 | 56.4 | 32.7 | 16.9 | 22.6 |
| 2-MB-2 | 21.3 | 38.5 | 64.4 | 77.7 | 75.0 |
| Percent conversion 2-MB-1 | 88.3 | 43.6 | 67.3 | 83.1 | 77.4 |
| Percent selectivity 2-MB-2 | 24.1 | 88.3 | 95.7 | 93.5 | 96.9 |
| Length of run, hours | 5.3 | 2.0 | .75 | 2.0 | 2.0 |

[1] Phillips pure grade.

The invention claimed is:

1. A process for the isomerization of olefins comprising contacting a reaction mass wherein said reaction mass is (a) aliphatic hydrocarbon olefins having 4 to 20 carbon atoms and at least one hydrogen atom alpha to the olefinic linkage, (b) said aliphatic hydrocarbon olefins and an inert diluent, (c) said aliphatic hydrocarbon olefins and oxygen or (d) said aliphatic hydrocarbon olefins, oxygen and an inert diluent with a supported catalyst consisting essentially of palladium oxide an dmolybdenum oxide in a weight ratio of palladium oxide to molybdenum oxide of about 0.05:1 to 0.6:1 deposited on a support material selected from the group consisting of silica, silica-alumina, alumina, aluminum phosphate, zirconia, boria, titania, magnesia pumice, kieselguhr, and fire brick, said molybdenum oxide being about 5 to 30 weight percent of said support, provided that when said reaction mass does not contain oxygen, said catalyst is pretreated by contacting said catalyst with a gaseous composition comprising oxygen and said aliphatic hydrocarbon olefins for a time sufficient to deactivate the disproportionation activity of said catalyst prior to contacting said catalyst with said said reaction mass.

2. The process according to claim 1 wherein the catalyst is palladium oxide and molybdenum oxide deposited on alumina.

3. The process according to claim 1 wherein the temperature is in the range of —20 to 200° C.

4. The process according to claim 3 wherein the temperature is in the range of about 0 to 150° C.

5. The process acccording to claim 4 wherein the temperature is in the range of 25 to 100° C.

6. The process according to claim 1 wherein the weight ratio of palladium oxide to molybdenum oxide is about 0.1:1 to 0.4:1.

7. The process according to claim 4 wherein the olefin has 4 to 6 carbon atoms.

8. The process according to claim 7 wherein the support is alumina.

9. The process according to claim 8 wherein the olefin is a normal butene.

10. The process according to claim 8 wherein the olefin is a methyl butene.

11. A process for the isomerization of 2-methyl butene-1 to 2-methyl butene-2 comprising contacting a reaction mass wherein said reaction mass is (a) 2-methyl butene-1, (b) 2-methyl butene-1 and an inert diluent, (c) 2-methyl butene-1 and oxygen or (d) 2-methyl butene-1, and inert diluent and oxygen with a supported catalyst consisting essentially of palladium oxide and molybdenum oxide in a weight ratio of palladium oxide to molybdenum oxide of about 0.1:1 to 0.4:1 deposited on a support material selected from the group consisting of silica, silica-alumina, alumina, alumina, aluminum phosphate, zirconia, boria, titania, magnesia pumice, kieselguhr, and fire brick, said molybdenum oxide being about 5 to 30 weight percent of said support provided that when said reaction mass does not contain oxygen, said catalyst is pretreated by contacting said catalyst with a gaseous composition comprising oxygen and 2-methyl butene-1 for a time sufficient to deactivate the disproportionation activity of said catalyst prior to contacting said catalyst with said reaction mass.

References Cited

UNITED STATES PATENTS 3,536,777   10/1970   Alkema et al. _____ 260—683 D

FOREIGN PATENTS 1,205,677   9/1970   Great Britain _____ 260—683 D

PAUL M. COUGHLAN, Jr., Primary Examiner

U.S. Cl. X.R.

252—465; 260—683 D

PO-1050
(5/69)

UNITED STATES PATENT OFFICE
CERTIFICATE OF CORRECTION

Patent No. 3,839,486      Dated October 1, 1974

Inventor(s) Robert P. Arganbright

It is certified that error appears in the above-identified patent and that said Letters Patent are hereby corrected as shown below:

Col. 1, line 16 reads "120°" but should read --- 120 ---.
Col. 1, line 48 reads "available in" but should read --- available is in ---.
Col. 4, line 57 reads "0.3" but should read --- 0 - 3 ---.
Col. 4, line 61 reads "C4" but should read --- $C_4$ ---.
Col. 4, line 62 reads "C5" but should read --- $C_5$ ---.
Col. 5, line 3 reads "an dmolybdenum" but should read --- and molybdenum
Col. 5, line 15 reads "with said said reaction" but should read --- with said reaction ---.
Col. 6, line 7 reads "and", (second occurrence) but should read --- an ---.
Col. 6, line 13 reads "alumina, alumina," but should read --- alumina, aluminum phosphate ---.

Signed and sealed this 1st day of April 1975.

(SEAL)
Attest:

RUTH C. MASON
Attesting Officer

C. MARSHALL DANN
Commissioner of Patents
and Trademarks